J. HUBER.
PIPE BENDING DEVICE.
APPLICATION FILED NOV. 27, 1912.
1,108,179.
Patented Aug. 25, 1914.
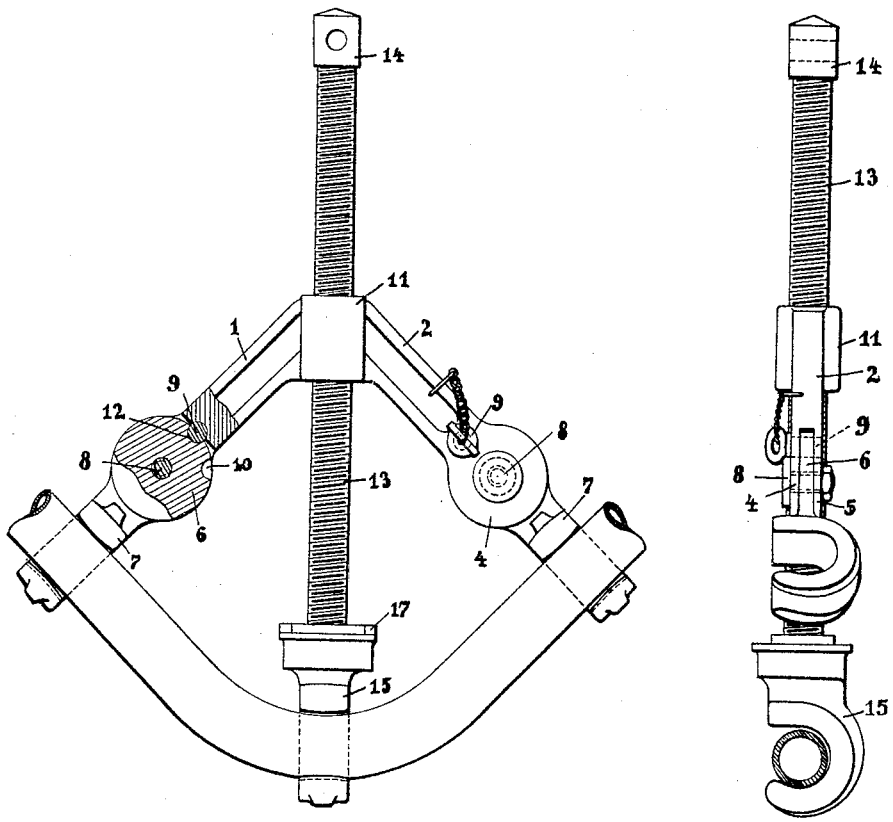
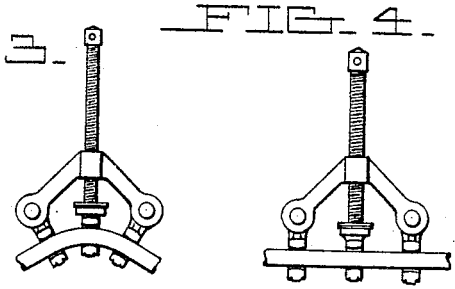
Witnesses:
Inventor:

UNITED STATES PATENT OFFICE.

JACQUES HUBER, OF ZURICH, SWITZERLAND.

PIPE-BENDING DEVICE.

1,108,179.  Specification of Letters Patent.  Patented Aug. 25, 1914.

Application filed November 27, 1912. Serial No. 733,895.

*To all whom it may concern:*

Be it known that I, JACQUES HUBER, a citizen of the Swiss Confederation, residing at Mythenstrasse No. 17, Zurich, Switzerland, have invented new and useful Improvements in Pipe-Bending Devices, of which the following is a specification.

This invention relates to a device for bending pipes of iron, etc. As it is well known the pipes for warm water or steam heating installations are laid out for each building in the workshops and bends are made approximately to the angle in order that the pipes may be simply screwed together by the fitter. It happens very often that the piping as sent out from the workshop does not fit the walls of the buildings, etc., and that the fitter has to adjust the pipes more or less.

The object of my invention is to provide a simple easily operated and effective device by which the pipes may be bent by the fitter after the pipes have been mounted.

In the accompanying drawings illustrating the invention: Figure 1 is a side elevation partly in section showing the application of the invention for bending a pipe-bend. Fig. 2 is an end elevation of the same. Figs. 3 and 4 show the device as applied to pipes.

The bending device embodying my invention comprises two arms 1 and 2 rigidly connected with a block 11. The free ends of the arms 1 and 2 are bifurcated and between the flanges 4, 5 of the two arms 1, 2 disks 6 of hooks 7 are pivotally mounted on bolts 8. The disks 6 are provided with notches 10 at the circumference and in the arms 1, 2 holes 12 are arranged co-axially with said notches 10. In the holes 12 a pin 9 is inserted which passes through one of the notches 10 and secures the hook 7 in its position. The block 11 is arranged on a line centrally between the arms 1, 2 and is provided with a threaded bore. A threaded spindle 13 is provided to work in the threaded bore in the block 11, through which it extends. The spindle 13 is provided with a head 14 having two cross bores for the reception of a bar by which said screw may be turned, the block 11 operating as a stationary nut for the up and down travel of said spindle 13. The spindle 13 carries a hook 15 which is connected to said spindle 13 by means of a swivel joint 17 of known construction.

In adjusting the pipe bend which may be done after the pipe has been fitted in the building the device is arranged as shown in Fig. 1 with the hooks placed over the pipe and the spindle 13 is screwed up or down as found necessary. If the pipe bend is only accessible from the outside of the bend the hooks 7 are set as shown in Fig. 3 and if an approximately straight pipe has to be bent the hooks 7 are set as shown in Fig. 4, the hooks 7 having in every case a good seating on the pipe.

Having thus fully described the invention what is claimed as new is:

A pipe bending device of the character described comprising in combination, a block having a threaded bore, a threaded spindle passing through said block, two arms rigidly connected to said block and having bifurcated outer ends, hooks adapted to parallelly engage the pipe walls and pivotally secured by disks provided with notches at their outer circumference between said bifurcated ends of said arms, bolts passing through said notches for securing said hooks in their adjusted position to said arms, a hook connected by a swivel joint joined to said spindle and means for turning said spindle to operate said hooks for holding and bending a pipe.

In testimony whereof I affix my signature in presence of two witnesses.

JACQUES HUBER.

Witnesses:
 FRITZ ISLE,
 AUGUST RÜEGG.

Copies of this patent may be obtained for five cents each, by addressing the "Commissioner of Patents, Washington, D. C."